No. 831,824. PATENTED SEPT. 25, 1906.
S. W. BRAINARD.
VALVE FOR FLUID PRESSURE MOTORS.
APPLICATION FILED FEB. 9, 1906.

3 SHEETS—SHEET 1.

No. 831,824. PATENTED SEPT. 25, 1906.
S. W. BRAINARD.
VALVE FOR FLUID PRESSURE MOTORS.
APPLICATION FILED FEB. 9, 1906.

3 SHEETS—SHEET 2.

WITNESSES:
E. B. Gilchrist
H. R. Sullivan

INVENTOR:
Sidney W. Brainard
by his attorneys
Thurston & Woodward

No. 831,824. PATENTED SEPT. 25, 1906.
S. W. BRAINARD.
VALVE FOR FLUID PRESSURE MOTORS.
APPLICATION FILED FEB. 9, 1906.
3 SHEETS—SHEET 3.
Fig. 9. Fig. 10.
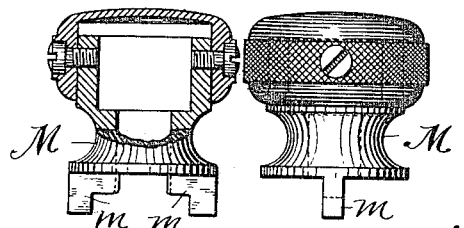
Fig. 4. Fig. 5. Fig. 6. Fig. 7. Fig. 8.
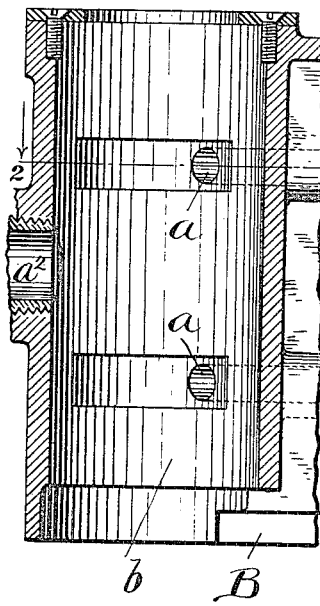
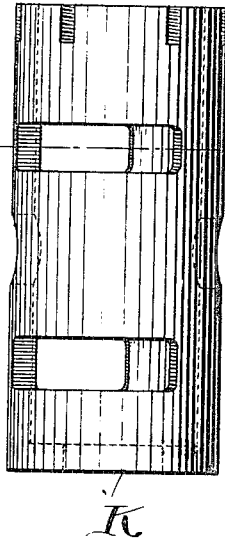
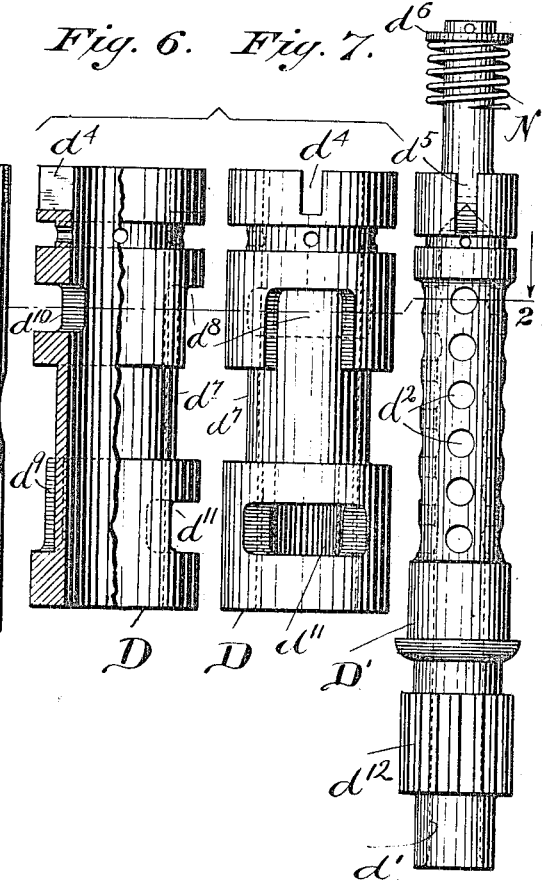
WITNESSES:
E. B. Gilchrist
H. R. Sullivan
INVENTOR:
Sidney W. Brainard
by his attorneys
Thurston & Woodward

UNITED STATES PATENT OFFICE.

SIDNEY W. BRAINARD, OF CLEVELAND, OHIO, ASSIGNOR TO THE CLEVELAND PNEUMATIC TOOL COMPANY, OF CLEVELAND, OHIO, A CORPORATION OF OHIO.

VALVE FOR FLUID-PRESSURE MOTORS.

No. 831,824.　　　Specification of Letters Patent.　　　Patented Sept. 25, 1906.

Application filed February 9, 1906. Serial No. 300,227.

*To all whom it may concern:*

Be it known that I, SIDNEY W. BRAINARD, a citizen of the United States, residing at Cleveland, in the county of Cuyahoga and State of Ohio, have invented a certain new and useful Improvement in Valves for Fluid-Pressure Motors, of which the following is a full, clear, and exact description, reference being had to the accompanying drawings.

The invention relates to novel means for controlling the flow of the pressure fluid to and from the cylinders of a fluid-pressure motor, and particularly to a rotary valve capable of performing the double function of an inlet and outlet valve for a plurality of motor-cylinders and capable also of being adjusted to reverse the direction of the rotation of the crank-shaft.

The invention consists in the construction and combinations of parts constituting said valve, the mechanism by which it is properly operated, and the portable motor of which they are parts; and it also consists in certain characteristics of construction for immediately relieving the pressure in the motor-cylinders at the end of the stroke of the piston therein, all of which will be hereinafter described, and pointed out definitely in the claims.

Figure 1:
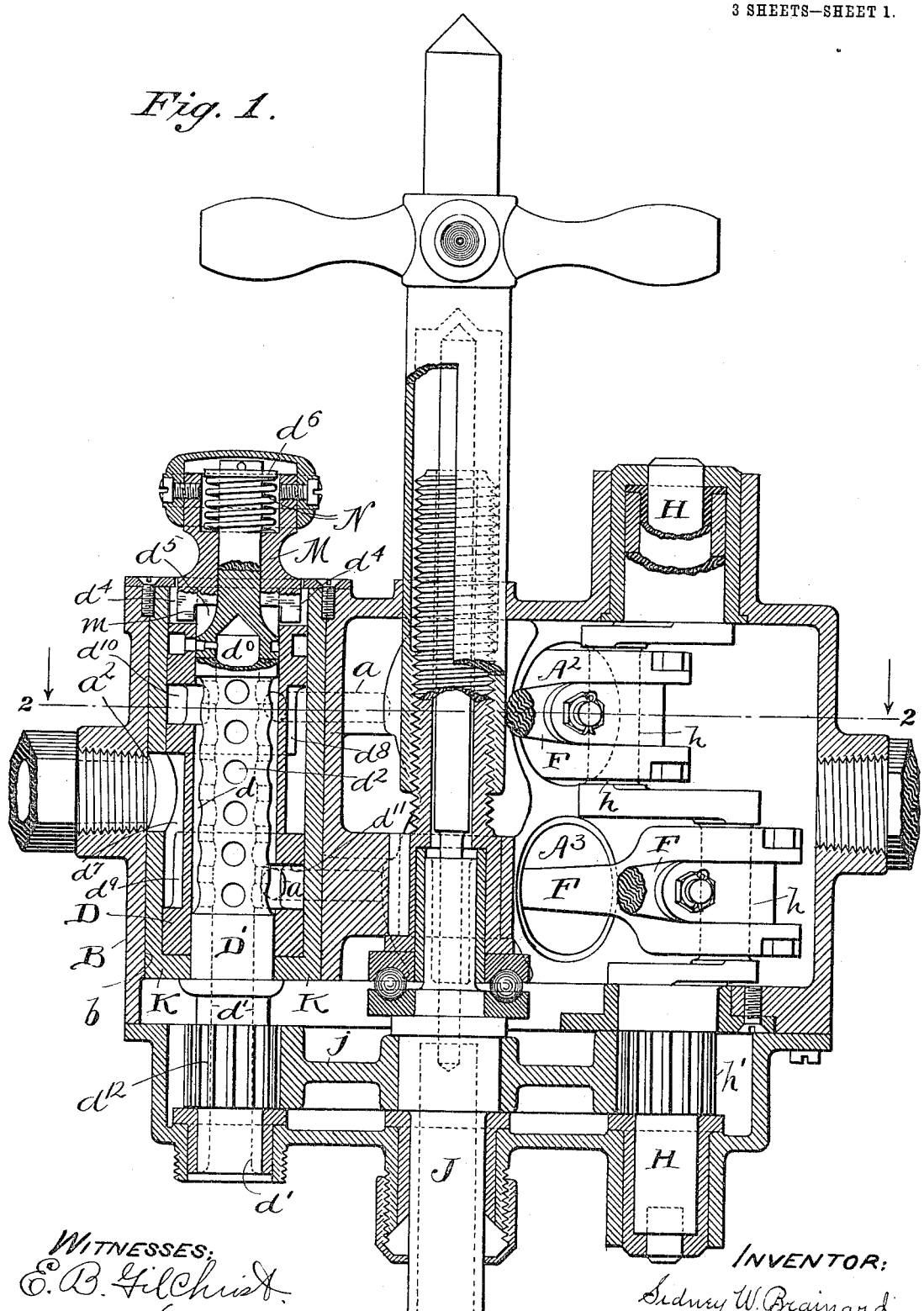
Figure 2:
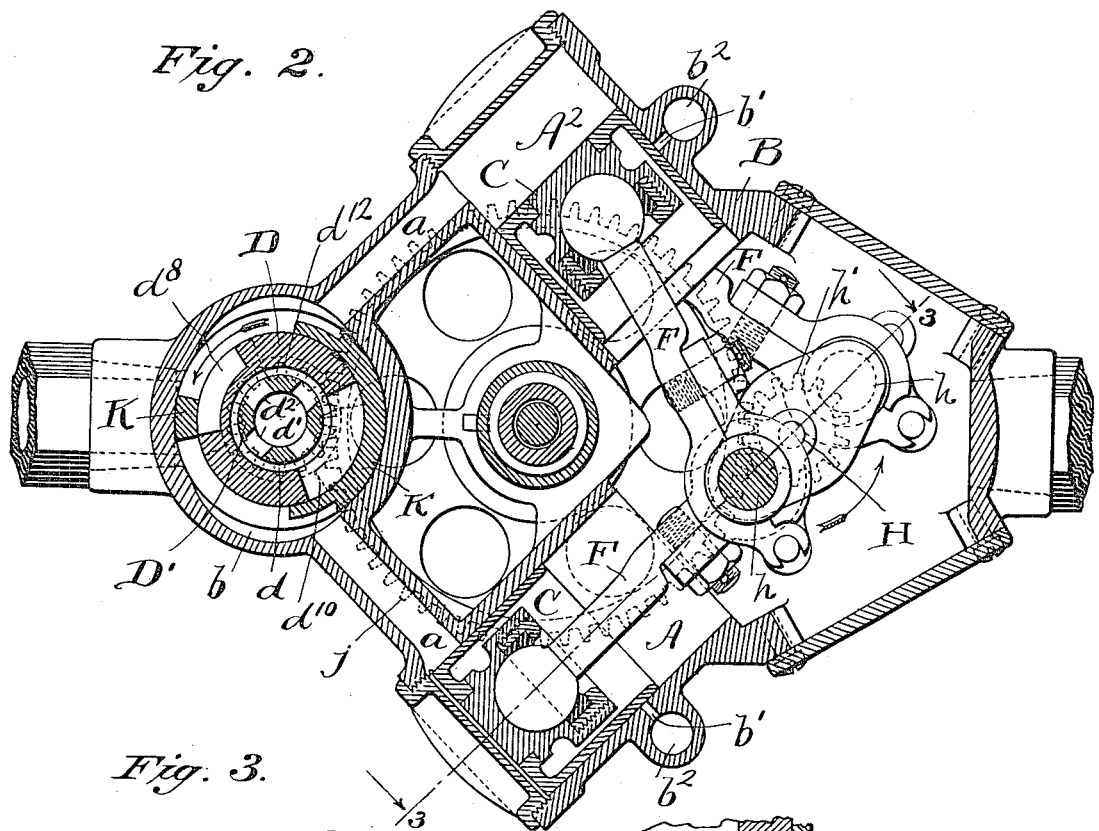
Figure 3:
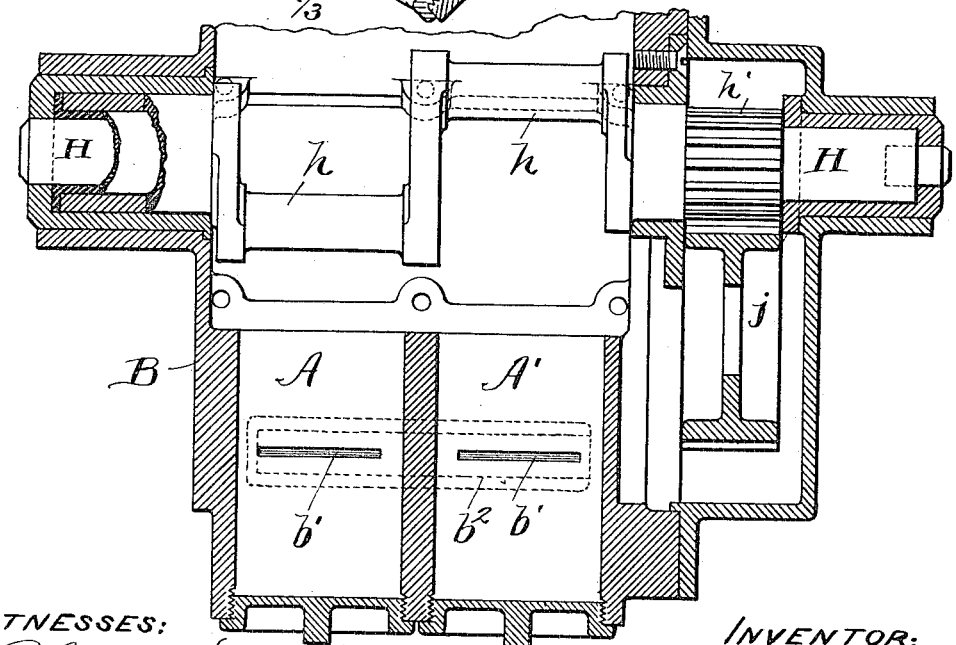

In the drawings, Figure 1 is a vertical sectional view of a fluid-pressure motor embodying the present invention, the section being in the plane indicated by line 1 1 on Fig. 2. Fig. 2 is a transverse sectional view in the plane indicated by line 2 2 on Fig. 1. Fig. 3 is a sectional view in the plane indicated by line 3 3 of Fig. 2. Fig. 4 is a longitudinal section of that part of the motor-casing which constitutes the valve-casing. Fig. 5 is an elevation of the bushing K. Fig. 6 is an elevation, partly in section, of the valve-shell. Fig. 7 is an elevation of said shell when turned one-quarter around. Fig. 8 is an elevation of the valve-stem. Fig. 9 is a view, partly in section, of the locking-collar M; and Fig. 10 is another view of said locking-collar.

The motor shown in the drawings, to which the present invention is applied, is, generally speaking, of familiar type, being specifically a portable pneumatic drill in which there are four cylinders whose axes are respectively at the intersections of two planes radial with respect to the crank-shaft and at right angles to each other and two other planes at right angles to the axis of said crank-shaft. These cylinders A A' A² A³ are formed in the motor-casing B. Each contains a single-acting reciprocating piston C, which is connected by a connecting-rod F with one of the two cranks $h$ on the crank-shaft H, said crank-shaft being rotatably mounted in the casing. The drill-spindle J is mounted in the casing B on an axis parallel with the crank-shaft and is provided with a gear $j$, meshing with the pinion $h'$ on the crank-shaft.

So much of the construction as above described is substantially the same as that which is fully disclosed in my prior patent, No. 769,247.

A cylindrical recess $b$, containing a bushing K, whose axis is parallel with the crank-shaft and drill-spindle, is formed in the casing B on the opposite side of the drill-spindle to that at which the crank-shaft is located. This recess and bushing serves as the valve-casing, and it is connected by four ports $a$ $a$ with the four cylinders, respectively, near their closed ends. Within this bushing is a rotary valve, which in the form shown is made of two concentric parts—to wit, the shell D and the stem D', which is embraced by the shell and is connected thereto, so that both must rotate together. The stem D' passes entirely through the shell and is fitted nicely to said shell near the ends of the latter; but between the places where the shell fits the stem closely the stem is reduced in diameter, so as to leave an air-space $d$ around it within the shell. The stem D' has a longitudinal hole $d'$ extending from its lower end to a point near its upper end, and in the wall of the stem are holes $d^2$, which establish communication between the hole $d'$ in the stem and the annular air-space around it. The stem extends out through the top and bottom of the casing. Embracing the projecting upper end of the stem, which is reduced in diameter, is a collar M, having projecting from its lower face two stepped wings $m$, adapted to enter grooves $d^4$ and $d^5$ in the ends of the shell and the enlarged part of the stem, respectively. A spring N surrounds the end of the valve-stem and is compressed between said sleeve and a projection, as collar $d^6$, on said stem, whereby the spring thrusts the collar M in that direction which maintains its wings in said grooves. By drawing the collar upward the wings are drawn from engagement with the shell, and therefore by turning the collar the shell is turned so as to change the relation of said shell to the stem and to the other parts of the device. As a matter of fact, the turning of said shell through one hundred and eighty degrees relative to the stem causes a reversal of the motor-shaft, because it brings the exhaust-ports of said shell into the positions previously occupied by the inlet-ports thereof. If it were not for the desirability of reversing the motor, the valve might be made of a single piece.

On the periphery of the valve-shell D is the inlet-port or depression $d^7$. This is in the form of a circumferential groove and is in the same plane with the port $a^2$, through which the pressure fluid is admitted to the valve-casing, and the circumferential groove $d^7$ has upwardly and downwardly extended branches $d^8$ $d^9$, which extend, respectively, into the planes of the ports $a$ $a$ of the upper and lower cylinders, and said branches are placed at diametrically opposite parts of the surface of said valve-shell. The valve-shell has also two exhaust-ports $d^{10}$ $d^{11}$, which extend through its wall to the annular space $d$ between it and the stem, and said ports $d^{10}$ $d^{11}$ are so placed that they may communicate with the two upper ports $a$ and the two lower ports $a$, respectively. These exhaust-ports $d^{10}$ $d^{11}$ are formed in diametrically opposite parts of the valve-shell, and the exhaust-port $d^{10}$ is directly over the lower branch $d^8$ of the inlet-port $d^7$, while the exhaust-port $d^{11}$ is directly under the upper branch $d^9$ of the inlet-port. The length of said ports circumferentially measured is such that the forward edge of the upper exhaust-port begins to move past one of the ports $a$ just the instant before the forward edge of the corresponding lower inlet-part begins to move past the corresponding one of the lower ports $a$, and vice versa. On the valve-stem near its lower end a pinion $d^{12}$ is secured, so as to be in mesh with the gear S on the spindle, said pinion $d^{12}$ being of the same diameter as the pinion $h'$ on the crank-shaft, whereby said valve-stem will rotate synchronously with said crank-shaft. In each cylinder is a narrow exhaust-slot $b'$, so placed that when the piston has approximately reached the end of its stroke this slot will be uncovered. These several slots communicate with ports $b^2$, discharging into the atmosphere. The described construction furnishes an auxiliary exhaust which comes into action just as the piston is finishing its stroke, and thereby so reduces the pressure in the cylinder that the piston may begin to move backward freely even before the flow of air through the main exhaust-port gets under way.

Having described my invention, I claim—

1. In a fluid-pressure motor, the combination of a cylinder, its piston, a crank-shaft, and connections between said crank-shaft and piston, with a rotary valve consisting of two concentric parts, to wit, a tubular shell having an exhaust-port through its wall, and an inlet-port in its surface, and a stem having a longitudinal hole open at one end, and one or more transverse holes through its wall connecting with said longitudinal hole, there being an annular space between the valve-shell and stem, mechanism adjustably connecting said shell and stem, and mechanism transmitting motion from the crank-shaft to said stem.

2. In a fluid-pressure motor, the combination of a cylinder, its piston, a crank-shaft, and connections between said crank-shaft and piston, with a rotary valve consisting of two concentric parts, to wit, a tubular shell having an exhaust-port through its wall, and an inlet-port in its surface, and a stem having a longitudinal hole open at one end, and one or more transverse holes through its wall connecting with said longitudinal hole, each of said parts having a locking-groove, a locking-collar having a tongue for engaging in said grooves, and mechanism transmitting motion from the crank-shaft to said stem.

3. In a fluid-pressure motor, the combination of a cylinder, its piston, a crank-shaft, and connections between said crank-shaft and piston, with a rotary valve consisting of two concentric parts, to wit, a tubular shell having an exhaust-port through its wall, and an inlet-port in its surface, and a stem having a longitudinal hole open at one end, and one or more transverse holes through its wall connecting with said longitudinal hole, the shell having a groove in its end and the stem having a grooved shoulder adjacent thereto, a locking-collar concentric with the stem and movable longitudinally relative thereto and having a stepped tongue for engaging with said grooves in the shell and stem, a spring acting to move the collar in the direction to cause such engagement, and mechanism transmitting motion from the crank-shaft to said stem.

4. In a fluid-pressure motor, a rotary valve consisting of two concentric parts, to wit, a stem having a longitudinal hole extending from one end inward a suitable distance, having transverse holes through its wall communicating with said longitudinal hole, and a shell embracing said stem, having inlet-port depressions in its surface and having exhaust-ports through its wall, and means adjustably connecting said shell and stem.

5. The combination of a cylindrical valve-casing having an inlet-port and an outlet-port, with a valve comprising two parts, to wit, a cylindrical shell which is rotatably fitted within said casing and has a depression in its surface adapted to connect the inlet and outlet ports, and a hole through it adapted to communicate with the outlet-port, and a stem rotatably fitted within said shell, which stem has an opening extending from one end inward a considerable distance, and holes through its wall by means of which communication may be established between the hole in the shell and the longitudinal hole in the stem, means for rotating said valve, and means for connecting together the valve and stem in either of two relative positions, substantially as specified.

6. A rotary valve comprising a cylindrical shell, a concentric cylindrical stem fitted therein and means for connecting the shell and stem together in either of two relative positions, the shell having a depression in its surface and two holes through its wall, and the stem having an exhaust-port which is always in communication with the holes through said shell, combined with a cylindrical casing fitting the shell, having an inlet-port and two outlet-ports in different transverse planes, substantially as specified.

In testimony whereof I hereunto affix my signature in the presence of two witnesses.

SIDNEY W. BRAINARD.

Witnesses:
E. B. GILCHRIST,
E. L. THURSTON.